United States Patent
Thomas et al.

(10) Patent No.: US 9,544,845 B2
(45) Date of Patent: Jan. 10, 2017

(54) POWER MANAGEMENT OF A RADIO DATA TRANSCEIVER

(71) Applicant: Apple Inc., Cupertino, CA (US)

(72) Inventors: Tito Thomas, San Jose, CA (US); Pierre Vandwalle, San Francisco, CA (US); Charles Francis Dominguez, Redwood City, CA (US); Tashbeeb Haque, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/678,784

(22) Filed: Apr. 3, 2015

(65) Prior Publication Data

US 2015/0215864 A1    Jul. 30, 2015

Related U.S. Application Data

(60) Continuation of application No. 13/730,651, filed on Dec. 28, 2012, now Pat. No. 9,002,414, which is a division of application No. 12/877,943, filed on Sep. 8, 2010, now Pat. No. 8,351,996.

(60) Provisional application No. 61/240,639, filed on Sep. 8, 2009.

(51) Int. Cl.
*H04W 52/02* (2009.01)
*H04W 76/06* (2009.01)

(52) U.S. Cl.
CPC ......... *H04W 52/0209* (2013.01); *H04W 52/02* (2013.01); *H04W 52/0216* (2013.01); *H04W 76/068* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,295,827 B2 | 11/2007 | Liu | |
| 7,505,795 B1 | 3/2009 | Lim | |
| 7,672,263 B2 | 3/2010 | Sinivaara | |
| 8,005,515 B1 | 8/2011 | Chhabra et al. | |
| 8,351,996 B2* | 1/2013 | Thomas | H04W 52/0216 455/574 |
| 8,576,762 B2* | 11/2013 | Thomas | H04W 52/0216 370/311 |
| 9,002,414 B2* | 4/2015 | Thomas | H04W 52/0216 455/574 |
| 2004/0067742 A1 | 4/2004 | Ormson | |
| 2004/0105401 A1* | 6/2004 | Lee | H04W 52/0216 370/311 |
| 2004/0259542 A1 | 12/2004 | Viitamaki et al. | |
| 2005/0068928 A1 | 3/2005 | Smith et al. | |
| 2006/0146769 A1* | 7/2006 | Patel | H04W 52/0229 370/338 |
| 2006/0159053 A1* | 7/2006 | Donovan | H04W 52/0216 370/338 |

(Continued)

*Primary Examiner* — Diane Mizrahi
(74) *Attorney, Agent, or Firm* — Sterne, Kessler, Goldstein & Fox P.L.L.C.

(57) ABSTRACT

Methods and apparatuses for operating a wireless mobile station configured to communicate with a wireless access point are described. A wireless mobile station can determine an interval of time between successive target beacon transmission times. The wireless mobile station can adjust, based at least in part on the interval of time, a period of time of an awake timer in response to having determined the interval of time.

20 Claims, 15 Drawing Sheets

(56) References Cited

U.S. PATENT DOCUMENTS

| | | |
|---|---|---|
| 2006/0160558 A1 | 7/2006 | Kim et al. |
| 2007/0036096 A1 | 2/2007 | Sinivaara |
| 2007/0147317 A1 | 6/2007 | Smith et al. |
| 2007/0165556 A1* | 7/2007 | Donovan .......... H04W 52/0229 370/318 |
| 2007/0230493 A1* | 10/2007 | Dravida ................. H04L 47/14 370/412 |
| 2007/0258397 A1 | 11/2007 | Ho et al. |
| 2010/0315983 A1 | 12/2010 | Choi et al. |

* cited by examiner

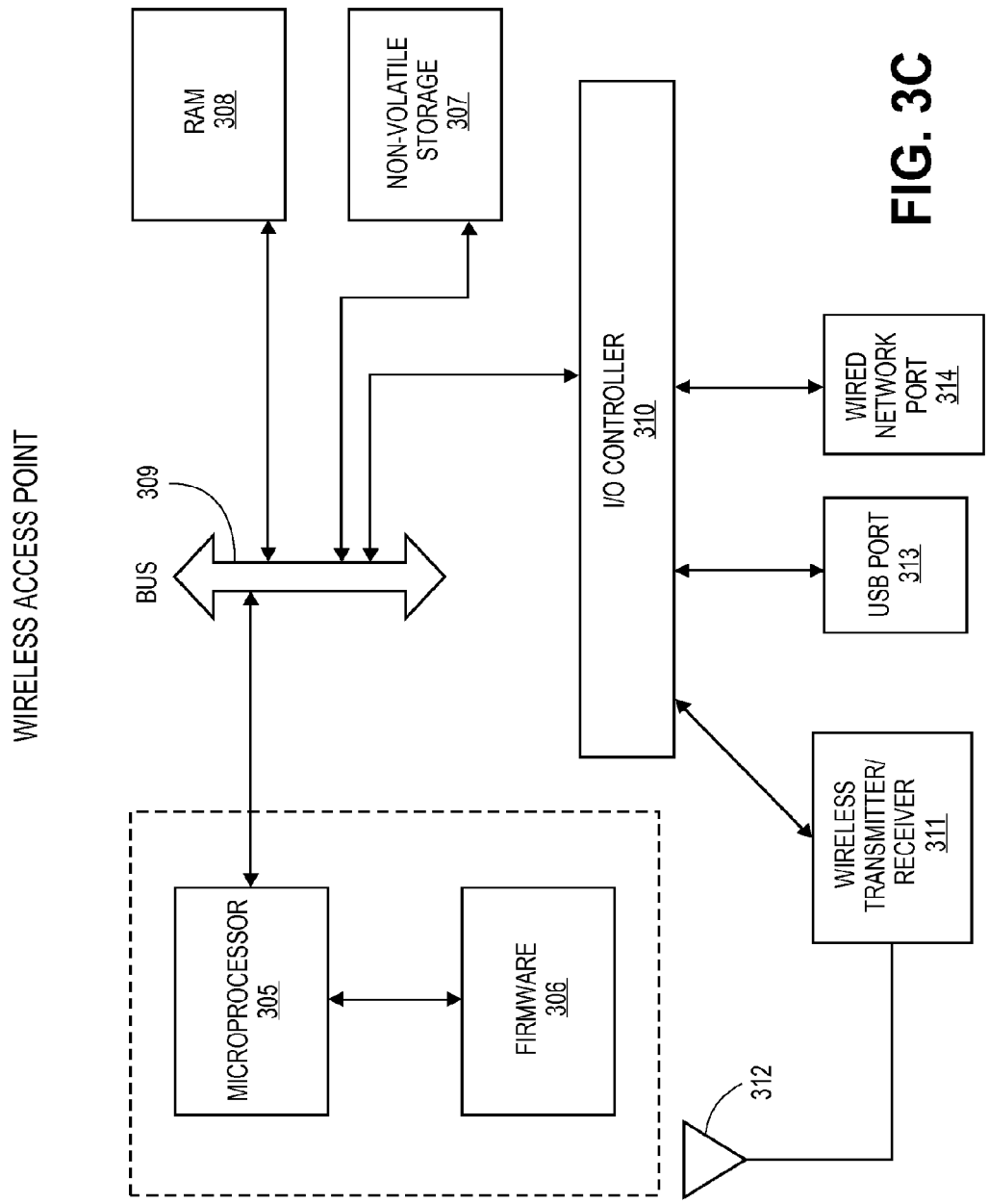

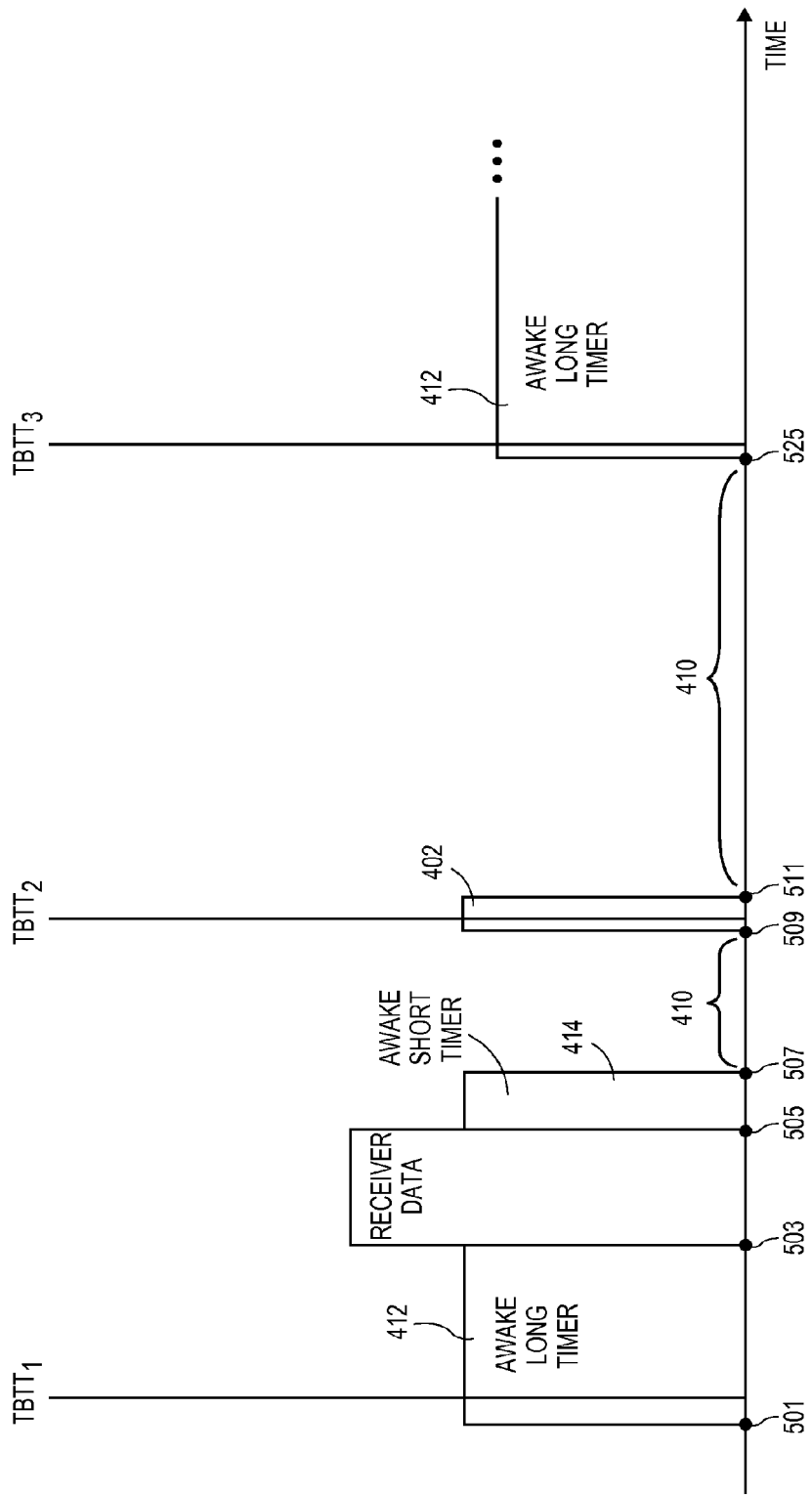

POWER MANAGEMENT OF A RADIO DATA TRANSCEIVER

CROSS-REFERENCE TO RELATED APPLICATIONS

This application is a continuation of, and hereby claims priority to, pending U.S. patent application Ser. No. 13/730,651, filed on 28 Dec. 2012, entitled "POWER MANAGEMENT OF A RADIO DATA TRANSCEIVER." The instant application also claims priority to U.S. patent application Ser. No. 12/877,943, filed on 8 Sep. 2010, entitled "POWER MANAGEMENT OF A RADIO DATA TRANSCEIVER," which issued as U.S. Pat. No. 8,351,996 on 8 Jan. 2013, of which parent application Ser. No. 13/730,651 is a divisional. The instant application further claims priority to U.S. provisional application No. 61/240,639, filed on 8 Sep. 2009 entitled "POWER MANAGEMENT OF A RADIO DATA TRANSCEIVER," to which both parent application Ser. No. 13/730,651 and grandparent application Ser. No. 12/877,943 claim priority. Each of these applications is incorporated by reference.

BACKGROUND OF THE INVENTION

Embodiments of the present invention relate to wireless communications and in one embodiment power management of a radio transceiver in a wireless device such as a smart phone or a media player which includes a radio transceiver.

Data processing systems, such as general purpose computers or smart phones or media players often include a radio transceiver in order to allow wireless connectivity to a network or to other devices. An example of a wireless network is a network which complies with the WiFi standards, such as the IEEE 802.11 standards or other known standards, such as the WiMax standard, etc. The radio transceivers in the data processing systems can consume considerable power and hence quickly run down a battery in a mobile device to the point that the device can no longer be used. Efforts in the past to reduce battery consumption by a radio transceiver have involved placing the radio transceiver in a sleep state in which it consumes lower power. For example, the radio transceiver can be turned off or otherwise placed in a low power state in which many of the components of the radio transceiver consume little or no power. FIG. 1A shows an example of a prior device which includes a radio transceiver which can communicate to a wireless network, such as a WiFi network. The radio transceiver can be placed in a sleep state 12 in which it has a reduced power consumption. There is a sleep timer which periodically causes the system to turn on the radio to check to see if there are any messages or data pending to be received by the device. This periodic checking for data is shown as event 20. If no data is available to be received by the device, it goes back to sleep as shown by event 20 which loops back to the sleep state 12. At any point in time the device can decide to transmit data in which case it will exit the sleep state as is known in the art and enter the awake state 14. In typical implementations according to the WiFi standards, a device will awake from sleep to check availability of data at either every beacon (referred to in the WiFi standards as a Target Beacon Transmit Time (TBTT) or at every multiple of beacons which is referred to as a DTIM period (Delivery Traffic Indication Message). As shown by the state diagram 10 in FIG. 1A, an event which awakes the device from sleep is the event 16; this event occurs when the sleep timer expires and the radio transceiver determines from the beacon signal from a wireless access point that there is data pending or available at an access point to be received by the device. This causes the device to transition from sleep state 12 to awake state 14. At this transition, an awake timer is started and this timer, when it expires, causes the device to transition from the awake state 14 back to the sleep state 12. The device can receive data or transmit data while it is in the awake state. An optional transition (not shown) from the awake state 14 back to the awake state 14 can be used to reset the awake timer when data is received or transmitted. As is known in the art, the sleep timer in the sleep state causes the system to periodically wake up to determine whether data is available for it, and the awake timer will force the system, when there is no network activity, to go back to sleep.

FIG. 1B shows an example in the prior art of how a radio transceiver can be controlled in order to regulate power consumption while still allowing the system to communicate wirelessly to a wireless network or other device. A plurality of TBTTs are shown in time. These TBTTs include TBTT 27 and TBTT 29, each of which correspond to a particular DTIM. It can be seen that the radio was turned on during the period 32 and also during the period 34, each of which span slightly more than one interval between successive TBTTs. The device operating as shown in FIG. 1B will turn its radio on during period 32 to listen for activity and then turn it off after realizing there is no activity for it; in other words, the device turns on the radio just before a TBTT and turns off the radio just after the next successive TBTT as shown in FIG. 1B. In the case where a device is in sleep state 12, it can re-enter the sleep state immediately from event 20 if the device determines that there is no data pending at the access point and if the device has no data to send to the access point.

While these techniques to control power consumption do produce some savings in power consumed, there is often a need for further reduction in power consumption.

SUMMARY OF THE DESCRIPTION

In one embodiment, a method for operating a wireless mobile station which is configured to communicate with a wireless access point includes maintaining, for at least a period of time in the wireless mobile station, a sleep state in which a radio frequency (RF) radio in the wireless mobile station is in a low power state and starting a first awake timer in response to receiving a beacon signal, from a wireless access point, wherein the beacon signal indicates that data is available or pending for the wireless mobile station. The method further includes receiving the data at the wireless mobile station from the wireless access point and starting a second awake timer in response to the receiving of the data, wherein when the second awake timer expires, the wireless mobile station returns to the sleep state. In one embodiment, the first awake timer counts for a first period of time and the second awake timer counts for a second period of time which is shorter than the first period of time. The RF radio is in a higher power state during the first awake state in which the first awake timer is counting, and the RF radio is also in a higher power state during a second awake state in which the second awake timer is counting. In one embodiment, the beacon signal has target beacon transmission times which are used by the wireless mobile station to synchronize itself with the wireless access point, which may be a WiFi basestation.

In another embodiment, a wireless mobile station uses a plurality of sleep states, each with a different sleep timer period based upon recent network activity. In one embodiment, a device may have two sleep states with two sleep timers, and in another embodiment a device may have three sleep timers for three sleep states. It will be understood that a sleep timer may be implemented purely in hardware or with general processing logic which is configured by software to implement the timers, which may be referred to as software timers. In one embodiment, a method for operating a wireless mobile station which is configured to communicate with a wireless access point, such as a WiFi access point, includes starting a first sleep timer for a first sleep state and using that first sleep timer to determine when to awake the device to determine whether there is any network activity. The device then determines whether a first period of network inactivity (e.g. no data has been received or transmitted during the first period) has occurred and, if so, it starts a second sleep timer for a second sleep state in response to determining that the first period of network inactivity has occurred. The method can further include determining whether a second period of network inactivity has occurred and, in response to determining that a second period of network inactivity has occurred, the device starts a third sleep timer for a third sleep state.

Another embodiment for operating a wireless mobile station can utilize a technique to adaptively adjust a period of time of an awake timer, such as a short awake timer. The adaptive adjustment can be based upon an interval of time between successive target beacon transmission times (TBTT). A method according to this embodiment can include determining, at the wireless mobile station, an interval of time between successive TBTTs and adjusting a period of time of an awake timer in response to the determining of the interval of time. In one embodiment, the adjusting may scale a default value of the period of time of the awake timer based upon the interval of time to produce an adjusted period of time for the awake timer. The adjusting may be performed through the use of a lookup table or other techniques. In one embodiment, the awake timer may use a time period of 20 milliseconds when the time between successive TBTTs is 100 milliseconds, and the device may use, when communicating with another access point, a 50 millisecond awake timer when that another access point has a time interval between successive TBTTs of 300 milliseconds. It will be appreciated that these examples are merely examples and that alternative embodiments may use other values. A device according to this embodiment can adaptively adjust as the device moves from one access point to another access point which may have different parameters and characteristics. For example, the device with the radio transceiver being controlled can adapt as it moves from a first wireless access point, which is no longer in communication with the device, to a second wireless access point which is now in communication with the device or wireless mobile station.

In another embodiment, a wireless mobile station may adjust a period of a sleep timer in response to either or both of the time between successive TBTTs and the time between successive DTIMs. A method according to this embodiment can include determining, at the wireless mobile station, an interval of time between successive TBTTs and determining, at the wireless mobile station, a setting representing an interval of time between successive DTIMs and adjusting a period of time of a sleep timer in response to either or both of the time between successive TBTTs and the time between successive DTIMs. For example, in one implementation, a wireless mobile station may dynamically or adaptively modify a multiple of DTIMs used to determine a sleep timer based upon how many TBTTs make up a particular DTIM for a particular access point. Moreover, the length of time between successive TBTTs can also be used to regulate or adjust the length of a sleep timer in a wireless mobile station.

In yet another embodiment, an RF radio of a wireless mobile station may be associated with a plurality of power states based on separate timers. A sleep timer may be started for the RF radio to enter a sleep state. The RF radio may be in a low power state when the sleep timer is counting. In response to the sleep timer expiring, a listening timer may be started to determine if a condition for the RF radio to exit from the sleep state is satisfied. The RF radio may be in a high power state when the listening timer is counting. An average power consumption of the wireless mobile station during the period of time when the mobile station is in the sleep state may be similar to the average power consumption of the wireless mobile station when the mobile station is in a low power state. In one embodiment, if the condition for the RF radio to exit from the sleep state is not satisfied, the sleep timer may be restarted for the RF radio to remain in the sleep state. Otherwise, the RF radio may enter another one of the power states.

The present invention also includes devices and apparatuses, including general purpose data processing systems and special purpose data processing systems. For example, embodiments of apparatuses or devices can include laptop computers, netbooks, desktop data processing systems, smart phones (e.g. an iPhone), a media player with an integrated radio transceiver (e.g. an iPod Touch), and other consumer electronic devices. Moreover, embodiments of the present invention include software or other computer instructions contained on a machine readable storage medium which stores the instructions; this media may include magnetic media, semiconductor media, and other known storage media.

It will be appreciated that the one or more embodiments may be combined together in various different combinations or used separately.

BRIEF DESCRIPTION OF THE DRAWINGS

The present invention is illustrated by way of example and not limitation in the figures of the accompanying drawings in which like references indicate similar elements.

FIG. 3C shows an example of a wireless access point in one embodiment.

FIG. 5 is a diagram depicting activity of a wireless station over time, wherein the wireless station can employ the state machine shown in FIG. 4A.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 2A:
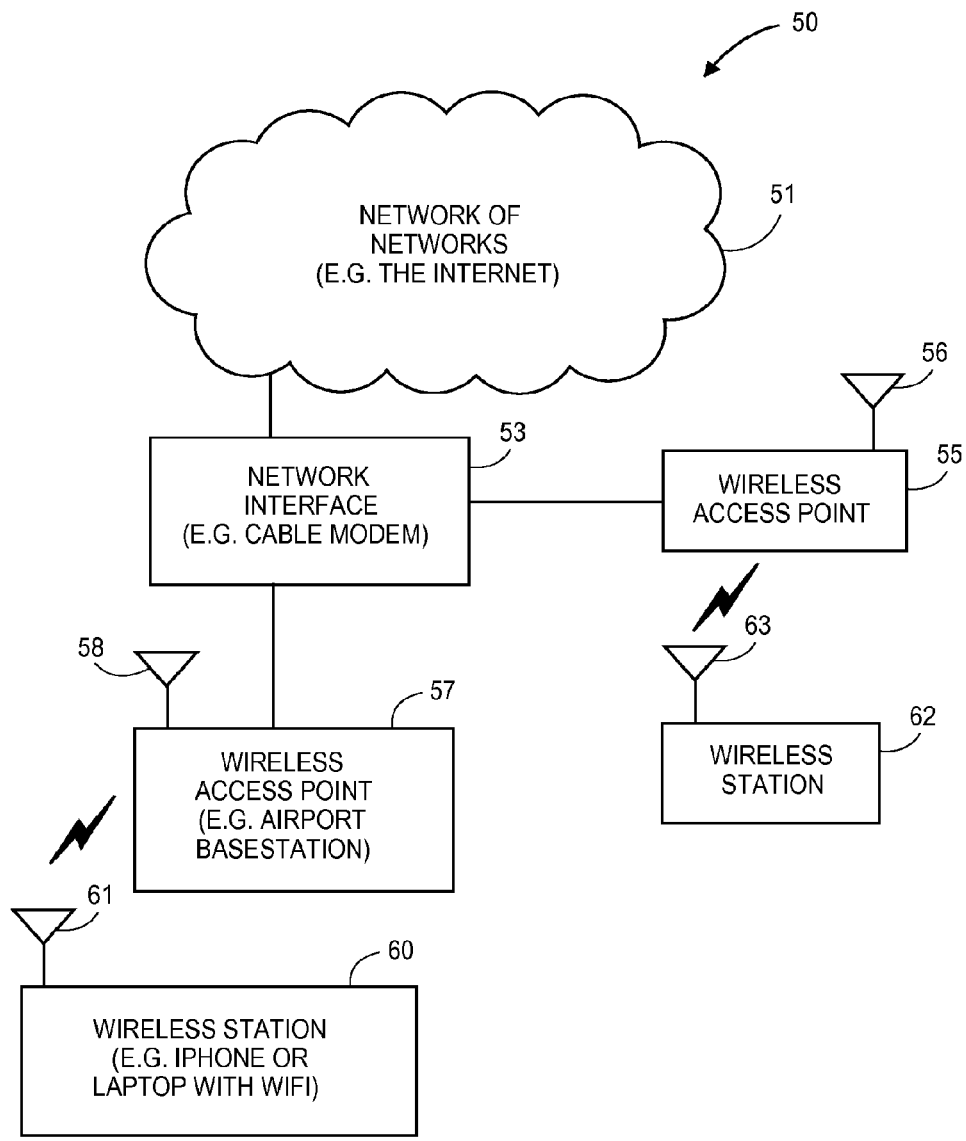
FIG. 2A shows an example of a system which includes several wireless access points and several wireless stations.
Figure 2B:
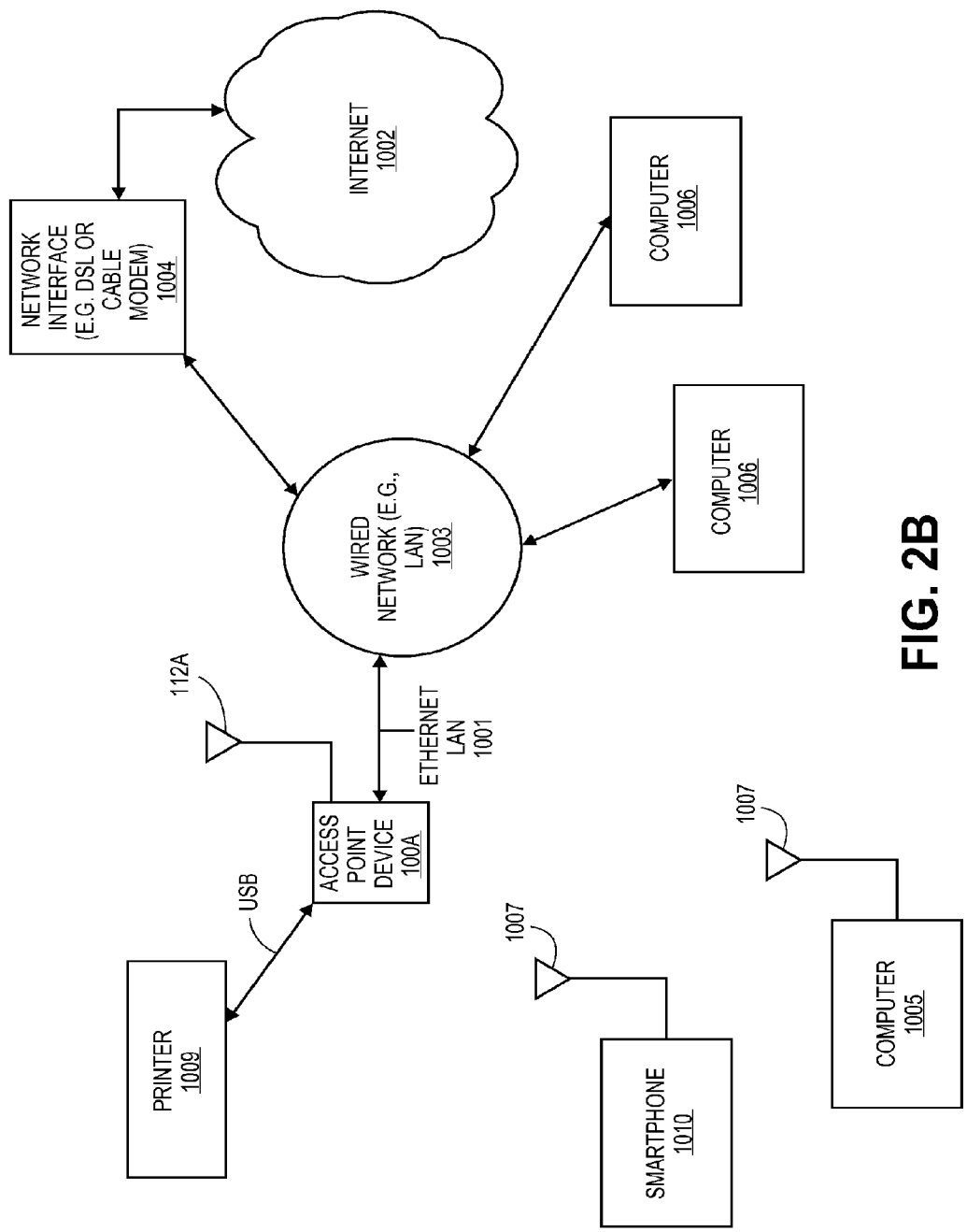
FIG. 2B shows another example of a system which includes an access point and several devices wirelessly communicating with that access point as well as a wired network.
Figure 3A:
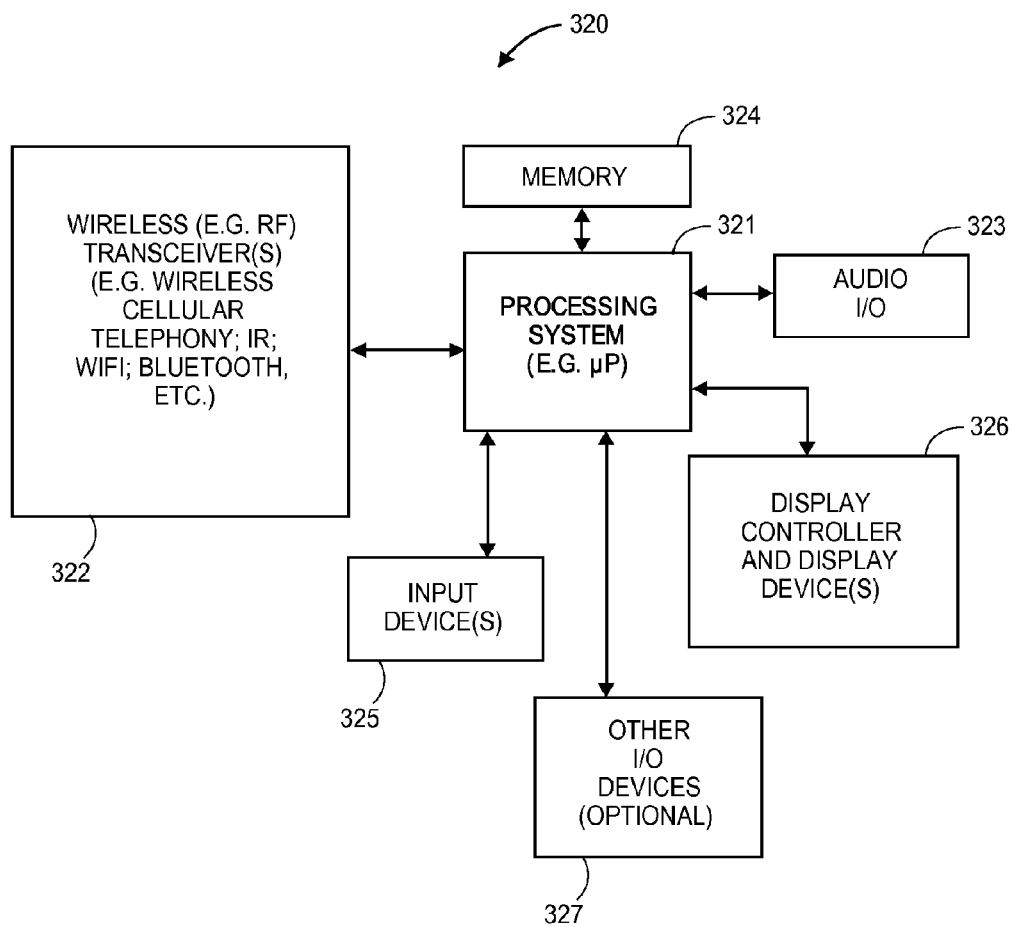
FIG. 3A shows an example of a data processing system, which may in one embodiment be a smart phone or a media player with an integrated wireless radio transceiver, etc.
Figure 3B:
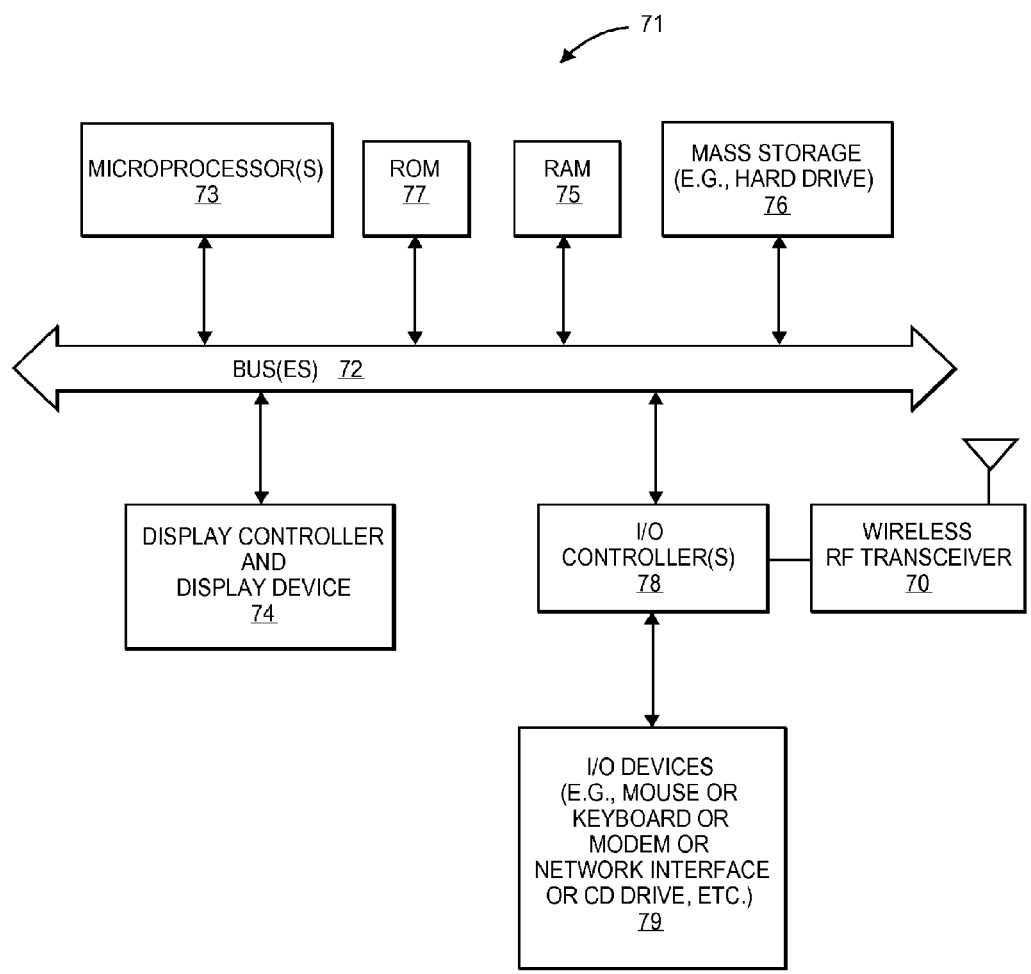
FIG. 3B shows an example of a data processing system which may be used to implement any one of the embodiments described herein and which may include a wireless radio transceiver for communication with a wireless network which includes a wireless access point.

The context and environment of the present invention will now be provided by discussing briefly FIGS. 2A, 2B, 3A, 3B, and 3C. A further description of these figures will be provided further below. FIG. 2A shows an example of a system 50 which can include a network of networks or merely one network (e.g. a Local Area Network in a home) and further includes a plurality of wireless access points which are coupled to this network. Two wireless stations are also part of the system and are in wireless communication with the wireless access points. A wireless station may be a wireless mobile station or a wireless device. It will be appreciated that wireless station 60 may move around such that communication with one wireless access point stops as the device moves away from the wireless access point and the device begins communicating with another wireless access point. According to some embodiments of the present invention, the device can adaptively adjust parameters which are used to control power consumption as it moves in space between the two wireless access points which can operate using different parameters, such as different multiples of TBTT per DTIM or have different periods of time between successive TBTTs. FIG. 2B shows another example of a system which includes an access point for communicating wirelessly with other wireless devices, such as the smart phone 1010 or the computer 1005. FIG. 3A shows an example of a data processing system which includes a wireless transceiver such as a wireless cellular telephony transceiver or a WiFi transceiver, etc. An iPhone or an iPod Touch may be an example of the device shown in FIG. 3A. Other examples include any consumer electronics device which includes a wireless radio transceiver and a processing system coupled to that wireless transceiver. FIG. 3B shows an example of a data processing system which may also be used in certain embodiments of the present invention. FIG. 3C shows an example of a wireless access point which may be used to provide wireless communication with a wireless station or device, such as the wireless station or device shown in FIG. 3A or shown in FIG. 3B.

Figure 4A:
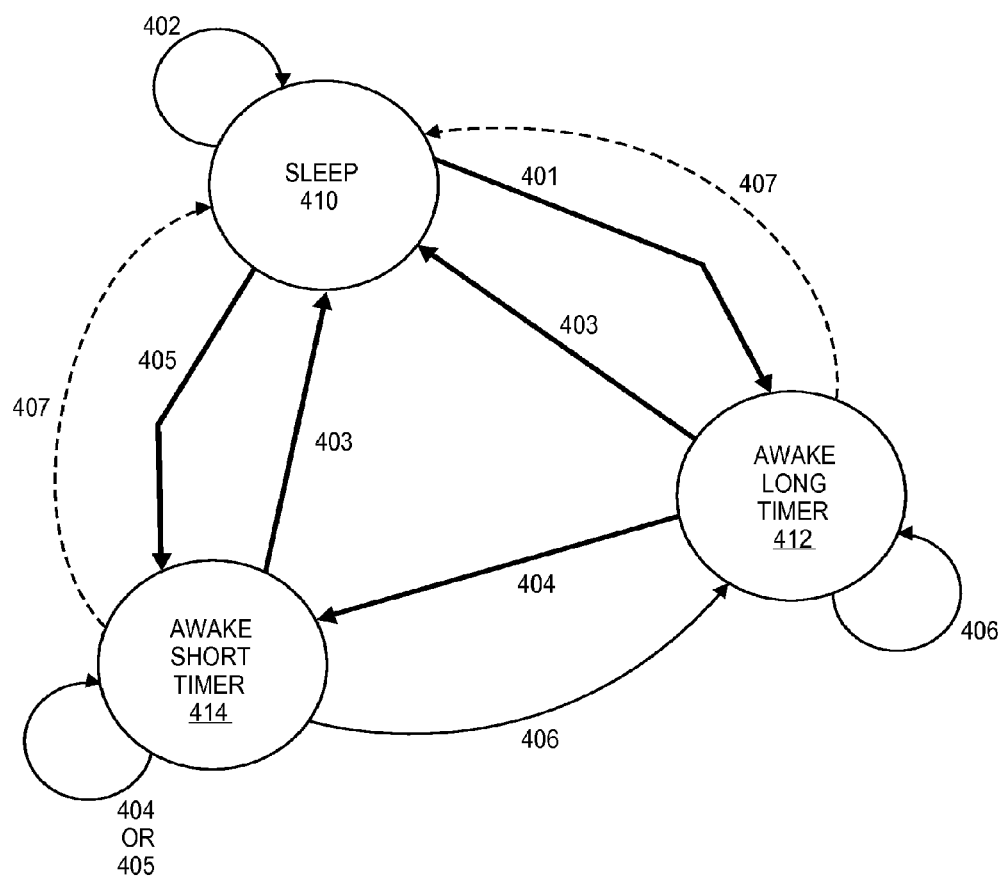
FIG. 4A shows an example of a state diagram which can be used to implement one embodiment of the present invention in a device of the present invention.

The state diagram shown in FIG. 4A shows an example of an embodiment in which a device can use a plurality of awake timers which can have different durations. The three states of the state machine for regulating a radio transceiver in a wireless station (which is in wireless communication with an access point) are the sleep state 410, the awake long timer state 412, and the awake short timer state 414. In the sleep state 410, the station's radio is off or otherwise in a low power state and the device periodically checks to see if data is pending or available at the access point for the wireless station. In the awake states 412 and 414, the station's radio transceiver is on or in a higher power state and the access point is allowed to transmit to the wireless station at any time. The events or transitions shown in FIG. 4A are as follows. Event or transition 401 occurs when the sleep timer expires and the system in the wireless station determines that there is data pending or available at the wireless access point. Event 402 occurs when the sleep timer expires and the system within the wireless station determines that there is no data pending at the access point for the wireless station. The event 403 occurs when either of the awake timers expire. For example, when the awake long timer expires, then the system transitions from awake long timer state 412 to the sleep state 410. When the awake short timer expires in state 414, the system transitions from state 414 to the sleep state 410. It will be appreciated that entry into a state will reset the timer within the state to cause it to begin counting from its initial position or count. For example, a transition such as the transition or event 403 will reset the sleep timer and the event or transition 402 will also reset the sleep timer. Similarly, events 404 and 405 as well as event 406 will reset the appropriate timer in the state being entered into from the event or transition. Event 404 represents the occurrence of the station receiving data, and the event 405 represents the occurrence of the station transmitting data. The event 406 occurs when the beacon from the access point indicates that there is data pending or available at the access point for the wireless station. It will be appreciated that in certain embodiments, optional events or transitions 407 may also be used, and this optional transition 407 occurs when a beacon arrives within one of the awake states and the system determines from the beacon that there is no data pending or available for the wireless station. As shown in FIG. 4A, the wireless station will maintain the sleep state 410 as long as there is no network activity for it. It will repeatedly and periodically check, as indicated by event 402, to determine whether there is data pending for the wireless station. Each event 402 occurs when the sleep timer expires and there is no data pending and hence the system resets the sleep timer and begins the process again. If there is data available, then the system moves to state 412, and when the data arrives, the system moves to state 414, as shown by event 404. If, after the data having arrived, the system is in state 414, and a beacon indicates that further data is pending at the access point, then the system transitions from state 414 to state 412 as shown in FIG. 4A.

Figure 4B:
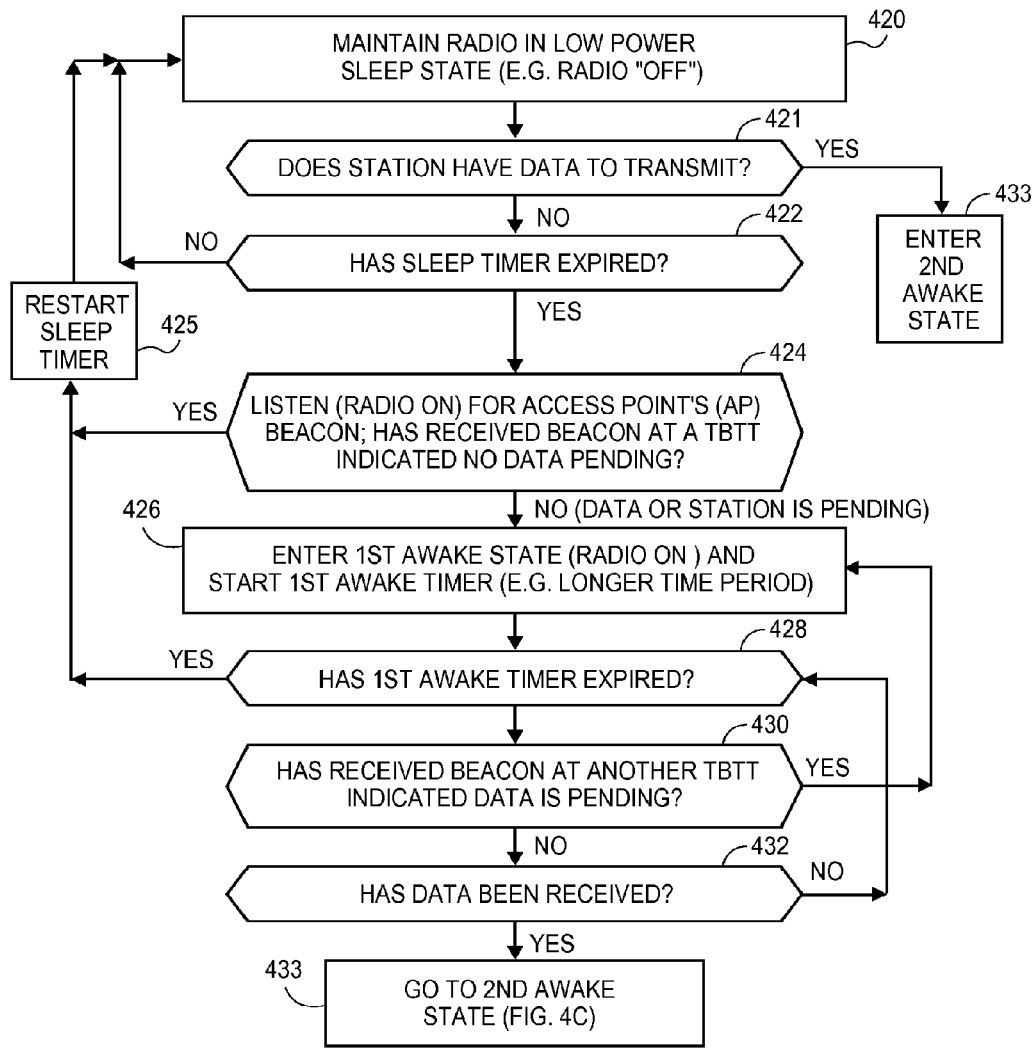
FIGS. 4B and 4C show an example of a method implemented according to the state machine shown in FIG. 4A.
Figure 4C:
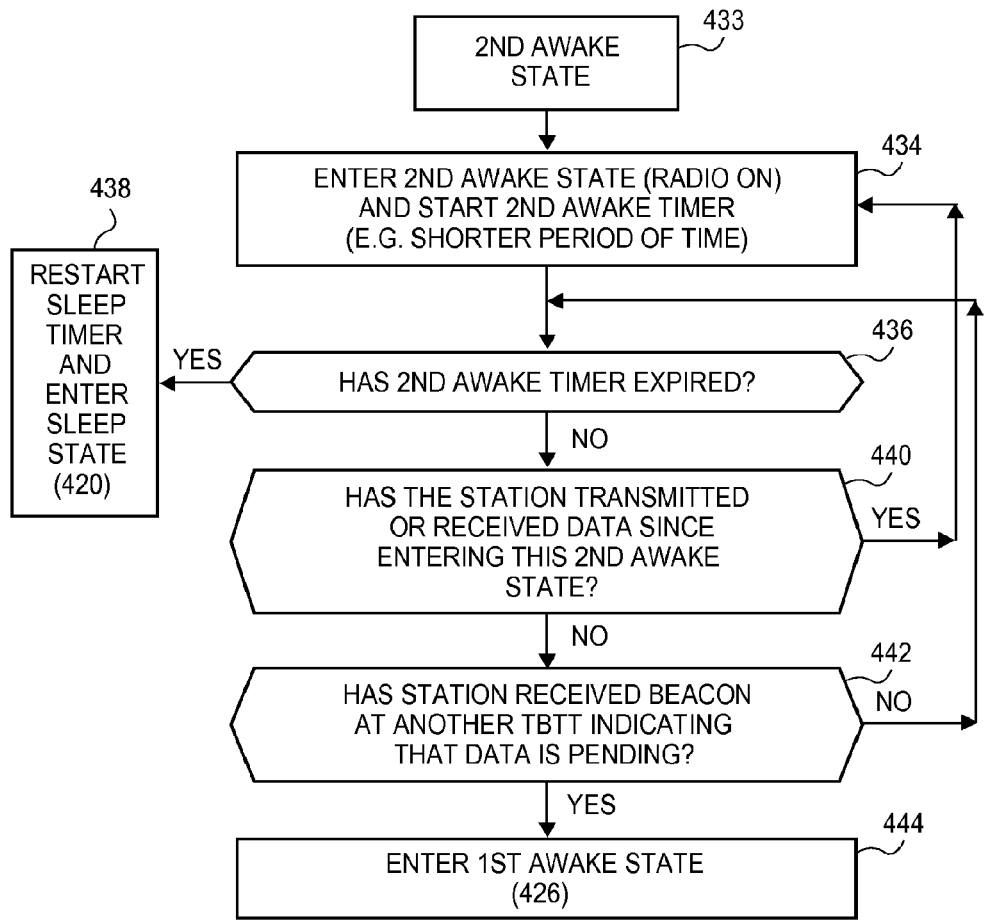

A further discussion of the state diagram of FIG. 4A will now be provided by describing the flowcharts of FIGS. 4B and 4C. Operation 420 represents part of the sleep state 410. This part maintains the radio in a low power state. In operation 421, the sleep state determines whether the station has data to transmit to the access point, and if it does, the system will transition to the second awake state shown as operation 433 in both FIGS. 4B and 4C. If the station does not have data to transmit as determined in operation 421, then processing can proceed to operation 422 in which it is determined whether the sleep timer has expired. If it has not, the system reverts to operation 420, otherwise it proceeds to operation 424 in which the radio is turned on from its low power state in order to listen for a beacon from the access point. For example, the station may enter a beacon listening state with a beacon listening timer with ultra short period of time shorter than a TBTT interval. The station may exit the beacon listening state when receiving a TBTT signal or when the beacon listening timer expires. A beacon listening state may be part of a sleep state. In some embodiment, a beacon listening state, an awake state and a sleep state are separate states of the station. It is then determined, e.g. when the station exists the beacon listening state, in operation 424 whether or not the received beacon at a TBTT has indicated that there is no data pending. If there is no data pending, then processing proceeds to operation 425 in which the sleep timer is restarted and the station reverts to operation 420. This sequence of operations 424 and 425 is shown as the event 402 in FIG. 4A. If a decision from operation 424 indicates that data is available or pending for the station, then processing proceeds from operation 424 to operation 426 in which the station enters the first awake state and turns the radio on or keeps the radio on and starts the first awake timer which can be the longer of the two time periods for the two different awake states. It can be seen that operation 426 represents the event 401, causing the station to enter state 412. It will be appreciated that operations 428, 430, and 432 occur within state 412.

In operation 428, the awake long timer state 412 determines whether or not the first awake timer has expired; if it has, processing proceeds from operation 428 to operation 425 in which the sleep timer is restarted and then the station reverts to the sleep state which includes operation 420. On the other hand, if the first awake timer has not expired, the system proceeds from operation 428 to operation 430 in which it is determined whether the station has received a beacon at another TBTT which indicates the data is pending for the station. If such a beacon has been received then processing proceeds from operation 430 to operation 426; this sequence is represented by the event 406 shown in FIG. 4A. Entry from event 406 into the awake long timer state 412 will restart or reset the timer for the awake long timer state 412. If there is no data pending for the station as determined in operation 430, then processing proceeds to operation 432 in which it is determined whether or not data has been received while in the awake long timer state 412. If it has not, processing returns to operation 428 which has been described above. If data has been received, then the transition or event 404 has occurred and the station will move from state 412 to the state 414 which is the second awake state which can have a shorter period of time.

FIG. 4C shows the processing within the second awake state. In operation 434, the station enters the second awake state and the radio is still on or is turned on if it was previously off. The second awake timer is also started from its initial position or count value. In operation 436, it is determined whether the second awake timer has expired. If it has, then processing proceeds to operation 438 in which the sleep timer is restarted and the station enters the sleep state 420. If operation 436 determines that the second awake timer has not expired, then processing proceeds to operation 440 in which it is determined whether the station has transmitted or received data since entering this instance of the second awake state. If it has, then processing returns back to 434 and the second awake timer is restarted to its initial position or count value. The transition from operation 440 to operation 434 is represented by the events 404 or 405 in FIG. 4A. If it is determined in operation 440 that the station has not transmitted and has not received data since entering the second awake state, processing proceeds to operation 442 in which it is determined whether the station has received the beacon at another TBTT, which beacon indicates that data is pending for the wireless station. If the answer to this decision block is no, then processing returns to operation 436; on the other hand, if the answer is yes, processing proceeds to operation 444 in which the system enters the first awake state which includes operation 426.

FIG. 5 shows a time diagram indicating an embodiment, such as the embodiment shown in FIGS. 4A-4C, in which a wireless station utilizes two awake timers which may have different time periods. Three TBTTs are shown in FIG. 5 over time and the activity of a radio of the wireless station is also shown in conjunction with those three TBTTs. As is known in the art, a wireless station will use the TBTT beacon signals to synchronize its timers, such as the sleep timer and the awake timers, in order to determine whether data is available and in order to receive the data. At time 501, the station exits a sleep state (e.g. because a sleep timer expired) and determines whether or not to remain in the sleep state or to enter the awake long timer state 412. In the example shown in FIG. 5, the station received a beacon which indicated that data was pending or available at the access point for the station. In response, this caused the system to transition from state 410 and enter state 412 in which it awaits data which it receives at time 503. At time 505, the access point stops transmitting data to the station and the station in response enters the awake short timer state 414 and starts the awake short timer. When the awake short timer expires, as shown at time 507, the system reverts to the sleep state 410. The station then awakens again at time 509 just before the second TBTT. In this case, there is no data pending for the station and so the station remains in the sleep state 402 but does include the event 402 in which the radio is temporarily powered on to check the beacon (e.g. based on a beacon listening timer) to determine whether data is pending. The station then quickly returns to the sleep state 410 as shown in FIG. 5 and the station continues on at time 525 by moving from the sleep state 410 to the awake long timer state 412.

By employing a second awake state which has a shorter time period than the first awake state, the system can achieve improved power consumption while at the same time not noticeably affecting the ability of the station to receive data in a prompt manner. In other words, the connectivity or the perceived connectivity of the device to a wireless network is not substantially affected by the use of two awake timers with two awake states while at the same time power consumption of such a station is improved, in some cases, substantially.

Figure 1A:
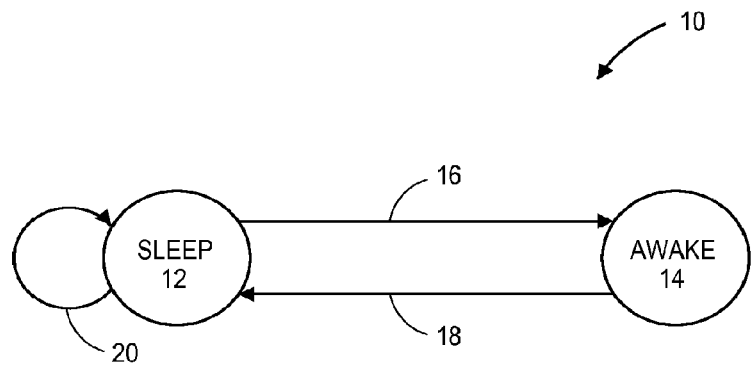
FIG. 1A shows an example in the prior art of a state machine for controlling a radio transceiver which is in communication with an access point in a wireless network.
Figure 1B:
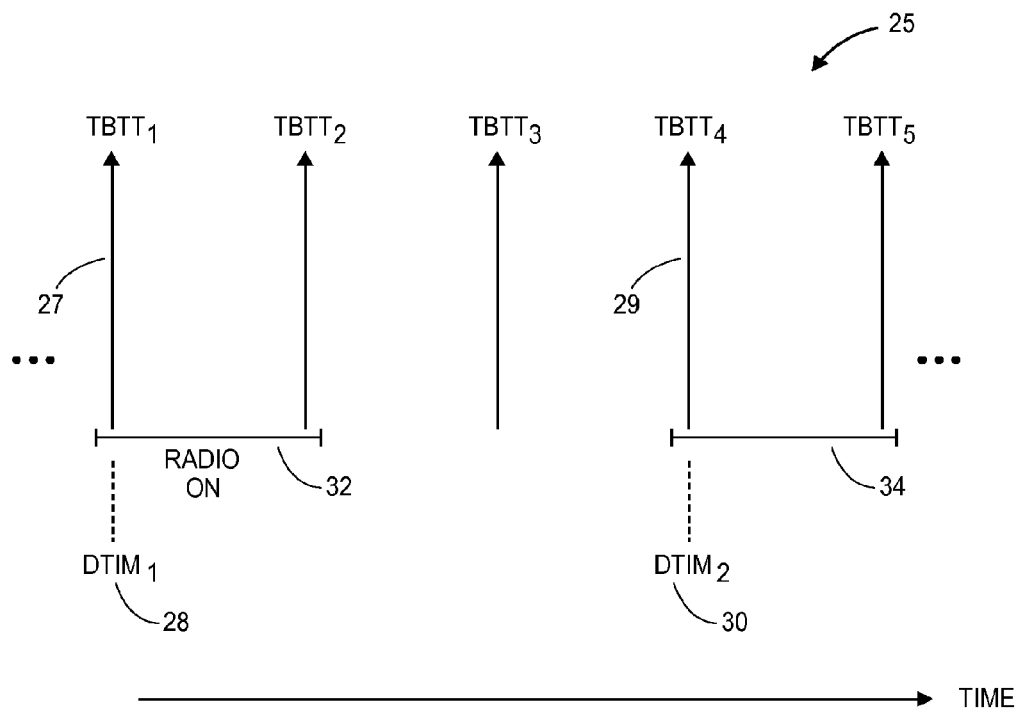
FIG. 1B shows an example in the prior art of how the device of FIG. 1A turns its radio transceiver on and off.
Figure 6:
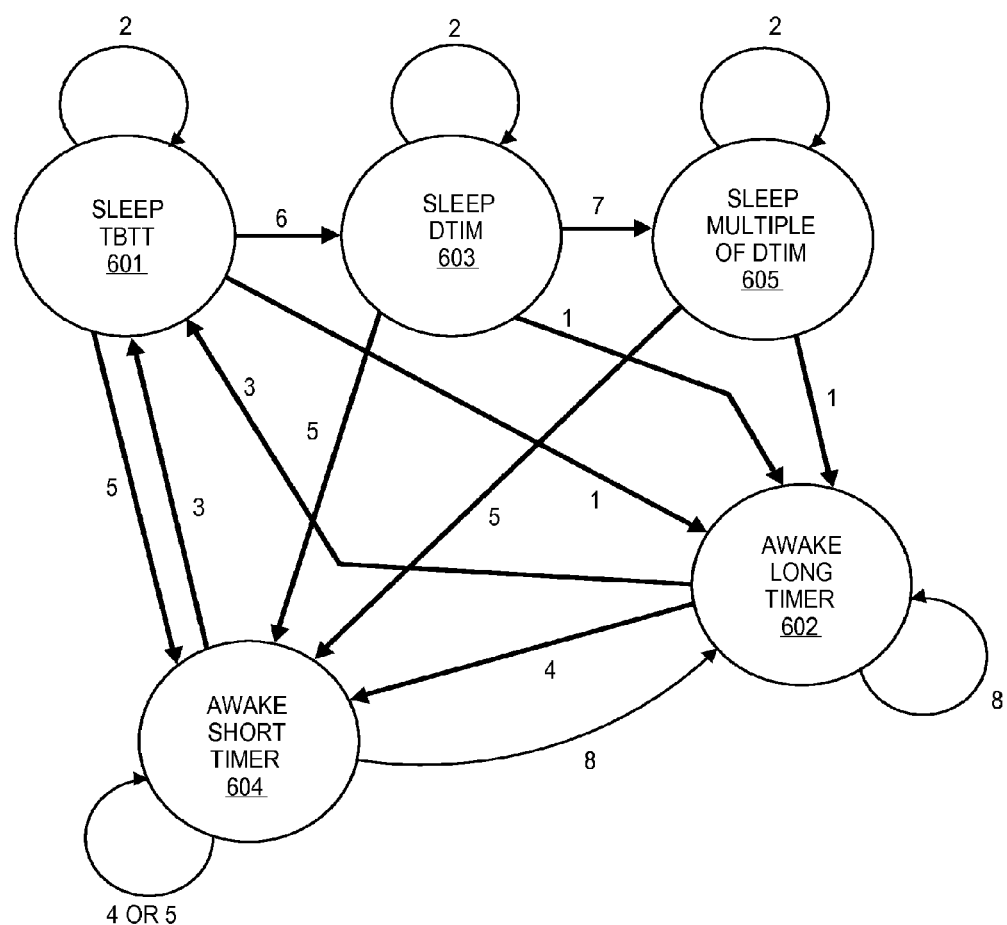
FIG. 6 is an example of another embodiment of the present invention in which a state machine, in a device of the present invention, implements multiple sleep states in addition to multiple awake states.

FIG. 6 shows a state diagram of an embodiment of the invention in which three different sleep states, with three different sleep timers, is used in combination with two different awake states, each having different timers. In this embodiment, the sleep state 601 has time period for its sleep which is equivalent to the interval of time between successive TBTTs. It will be appreciated that this time interval may be slightly more or less than the actual time period because of the need to begin monitoring the beacon just before the next expected TBTT as is known in the art. This can be seen in FIG. 1B in which the radio is turned on shortly before the next expected TBTT and is turned off shortly after the following TBTT. Hence, the term "the interval of time between successive TBTTs" will be understood to include this slight variation in time. In sleep state 603, the sleep timer uses a time interval equivalent to one DTIM (Delivery Traffic Indication Message) which is normally a multiple of several successive TBTTs. The sleep state 605 utilizes a sleep timer which is a multiple of DTIMs. The operations of each of the states shown in FIG. 6 is similar to the operations of the corresponding states shown in FIG. 4A. For example, each sleep state includes an event 2 in which the sleep timer expires and the station determines, after turning on and turning off the radio, that there is no data pending at the access point for the station. The sleep state 601 will check for data pending at the access point every TBTT. The sleep state 603 will check for data, shown by event 2, pending at the access point for every DTIM period. As is known in the art, the DTIM period under a WiFi standard, such as 802.11G, is set by an access point and is a multiple of the beacon period represented by a single TBTT. In sleep state 605, the station will, as shown by event 2, repeatedly check for data pending at the access point every nDTIM periods, where n is the number of DTIM periods for which the sleep timer counts. In one embodiment, the station can calculate the sleep period of the sleep state 605 adaptively as described below so that the overall time period is a particular value or within a particular range.

The events or transitions shown in FIG. 6 are as follows. As noted above, event 2 occurs when the sleep timer expires within a particular sleep state and the station determines that no data is pending at the access point for the station. Event 1 occurs when the sleep timer expires and there is data pending or available at the access point for the station. Event 3 occurs when a particular awake timer expires from either the awake long timer state 602 or the awake short timer state 604. When the awake timer expires, the station transitions from one of the awake timer states back to the sleep state 601 as shown in FIG. 6. In alternative embodiments, the station may revert to one of the other sleep states and further transitions may be included in order to return the system back to sleep state 601. Event 4 occurs when the station receives data, and this causes the station to transition from state 602 to state 604. Event 5 occurs when the station transmits data, and event 5 can cause the transition from any of the sleep states 601, 603, or 605 to the short timer awake state 604 as shown in FIG. 6. Event 6 occurs when the station determines that there has been network inactivity for at least a period of time equal to a certain value, which may be a multiple of DTIMs. In one embodiment, the period may be equivalent to two DTIMs. This event will cause the transition from sleep state 601 to state 603, and this transition is further described in connection with FIGS. 7A and 7B, and in particular is shown as operation 705 and 707. Event 7 occurs when the period of network inactivity exceeds a certain period of time which may be a multiple of DTIMs or a fixed period of time such as 4 seconds or 6 seconds, etc. Event 8 occurs when the beacon at a TBTT indicates that there is data pending or available at the access point for the wireless station. Transitions shown in FIG. 6 will reset the timers for each state being entered into. For example, the transition or event 8 will reset the awake long timer maintained in the state 602 and transition 4 will reset the short timer maintained by the state 604. Similarly, transition 5 will reset the short timer maintained in state 604.

Figure 7A:
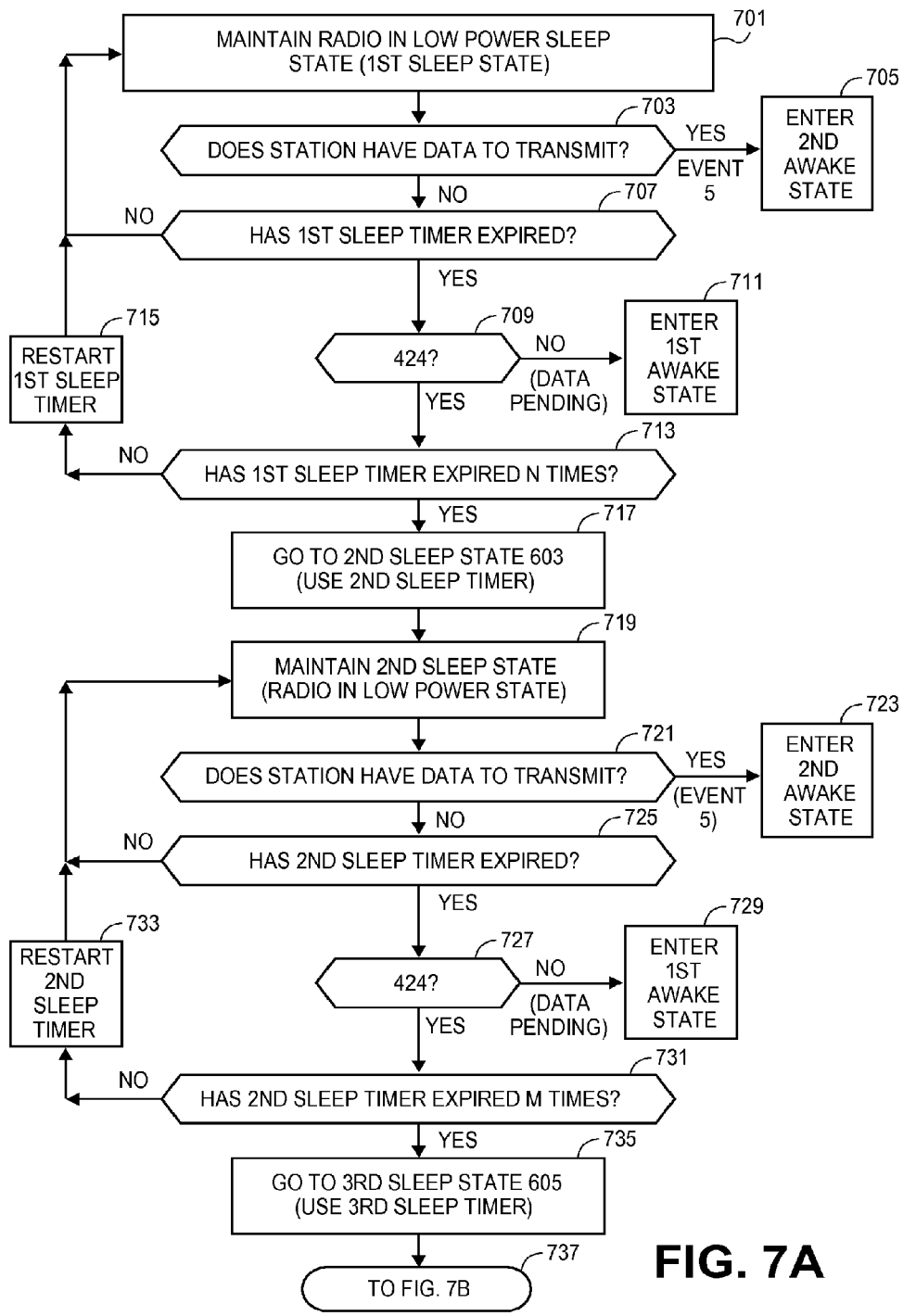
FIGS. 7A and 7B are flowcharts showing an example of a method according to one embodiment of the present invention in which multiple sleep states are utilized by a device of the present invention.
Figure 7B:
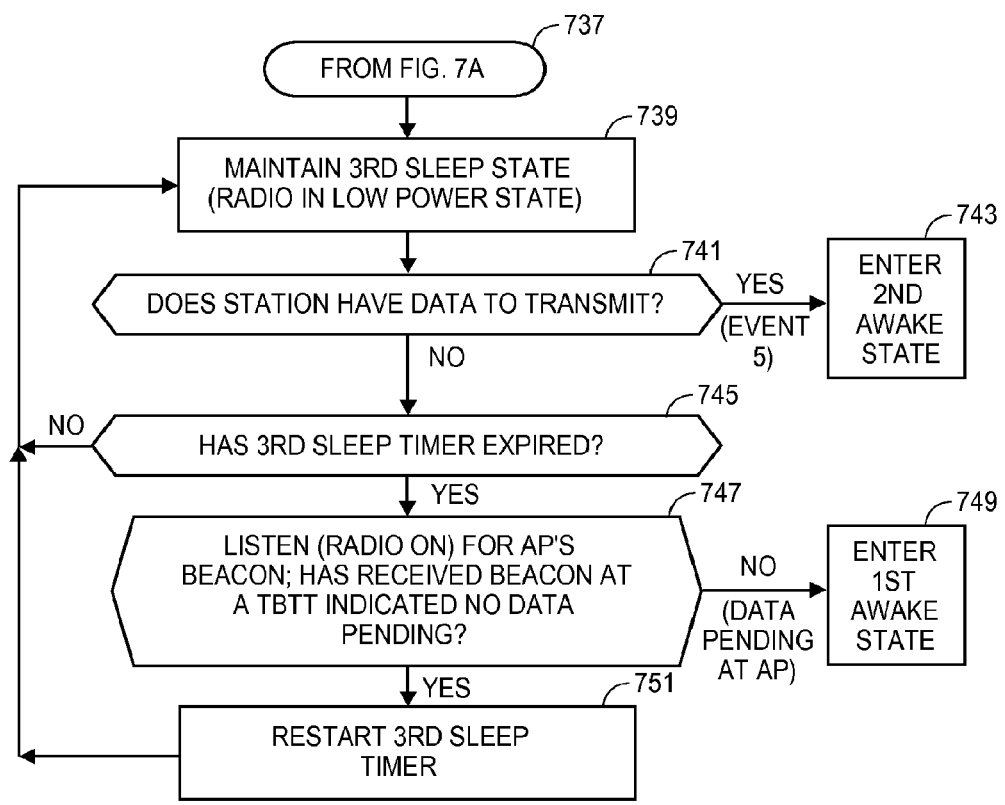

FIGS. 7A and 7B are simplified flowcharts showing a portion of the operations provided by a state machine shown in FIG. 6. The flowchart of FIGS. 7A and 7B are focused on the three sleep states 601, 603 and 605 and show how the station can use three different sleep timers depending upon network activity. It will be appreciated that some of the operations of the state machine in FIG. 6 are omitted from FIGS. 7A and 7B in order to simplify the appearance of these figures. The method shown in FIGS. 7A and 7B can begin in operation 701, in which the station maintains the radio in a first sleep state which corresponds to sleep state 601 in FIG. 6. In operation 703, the sleep state 601 determines whether the station has data to transmit to the access point (AP), and if it does, the system will transition to the second awake state (state 604); the transition is shown as the entry to operation 705 in FIG. 7A and corresponds to event 5 on FIG. 6. The station operates in the second awake state as shown in operations 433, 434, 436, 438, 440, 442 and 444 in FIG. 4C except that when the second awake timer expires (as determined in operation 436), the station returns to the first sleep state 601 and restarts the first sleep timer (thereby returning to operation 701).

If the station does not have data to transmit as determined in operation 703, then the station determines, in operation 707, whether the first sleep timer has expired; if it has not, processing returns to operation 701, otherwise (it has expired) processing performs operation 709 (which is the same as operation 424 in FIG. 4B—listen to AP's beacon to determine if TBTT indicated no data is pending for the station). If data is pending as determined by operation 709, then the station performs operation 711 and thereby enters the first awake state 602. The station operates in the first awake state as shown in operations 426, 428, 430, 432 and 433 in FIG. 4B except that when the first awake state expires (as determined in operation 428), the station returns to the first sleep state 601 and restarts the first sleep timer (thereby returning to operation 701). If operation 709 determines that no data is pending at the AP for the station, then the station determines, in operation 713, whether the first sleep timer has expired N times (i.e. the station has not exited from or remained in the first sleep state for a certain period of time), where N can be set adaptively as described herein. N can be based on a selected or predefined period of time (e.g. 2 seconds, etc.) or can be based on a multiple of DTIMs, etc. If the first sleep timer has not yet expired N times, then operation 715 follows, thereby restarting the first sleep timer and processing returns to operation 701. If the first sleep timer has expired N times then processing retstarts the second sleep timer and moves to operation 717, which is the entry to the second sleep state (event 6 in FIG. 6) shown as sleep DTIM 603 in FIG. 6.

In the second sleep state, as shown in operation 719, the radio is maintained in a low power state and operation 721 determines whether the station has any data to transmit to the AP. If it does, then the station enters (through event 5) the second awake state (shown as operation 723), and operates in the same manner as operation 705 described above; if the station does not have data to transmit then processing proceeds to operation 725 which determines whether the second sleep timer has expired. If the second sleep timer has not expired then processing returns to operation 719, otherwise (it has expired) processing proceeds to operation 727 (which is the same as operation 424 in FIG. 4B—turn on the radio and listen to the AP's beacon to determine if the current TBTT indicates that no data is pending for the station). If data is pending, as determined in operation 727, then the station performs operation 729, the entry into the first awake state 602, and the station operates in the same manner as operation 711 described above. If no data is pending, as determined in operation 727, then processing proceeds to operation 731 which determines whether the second sleep timer has expired M times. M, an integer, can be set adaptively as described herein; M can be based on a selected or predefined period of time (e.g. 4 seconds, etc.) or can be based on a multiple of DTIMs (e.g. larger than the value used for N), etc. If the second sleep timer has not expired M times as determined in operation 731, then operation 733 follows, thereby restarting the second sleep timer and returning to operation 719; if the second sleep timer has expired M times, then operation 735 (shown as event 7 in FIG. 6) follows operation 731, and the station enters the third sleep state and restarts the third sleep timer and processing proceeds to operation 739, in which the third sleep state is maintained (and the radio is in a low power state).

During the third sleep state (shown as state 605 in FIG. 6), the station repeatedly (and periodically in one embodiment) determines, in operation 741, whether it has data to transmit. If it does, event 5 occurs and operation 743 (entry in the second awake state) follows operation 741. Operation 743 can operate in the same manner as operation 705 described above. If the station does not have data to transmit, processing can proceed to operation 745, which determines whether the third sleep timer has expired; if the third sleep timer has not expired then processing returns to operation 739, otherwise (it has expired) processing moves to operation 747 which at least momentarily turns on the radio to listen for the AP's beacon (e.g. based on a beacon listening timer) and determines whether the received beacon at a TBTT indicated that no data was pending at the AP for the station. If no data is pending (as determined in operation 747) the radio is returned to the low power state and the third sleep timer is restarted (operation 751) and processing returns to operation 739. It will be appreciated that the radio, in operations 424, 709, and 727 can be only momentarily powered on for the purpose of listening to the beacon and then be immediately returned to its low power state if no data is pending at the AP for the station; this sequence is shown in FIG. 5 between times 509 to 511. If operation 747 determines that data is pending at the AP for the station, then, in operation 749, the station enters (event 1) the first awake state and restarts the first awake timer. Operation 749 can operate in the same manner as operation 711 described above. In this manner, a wireless station can monitor its network activity and adaptively adjust the sleep state and period of time for the sleep state based upon network activity.

Figure 8:
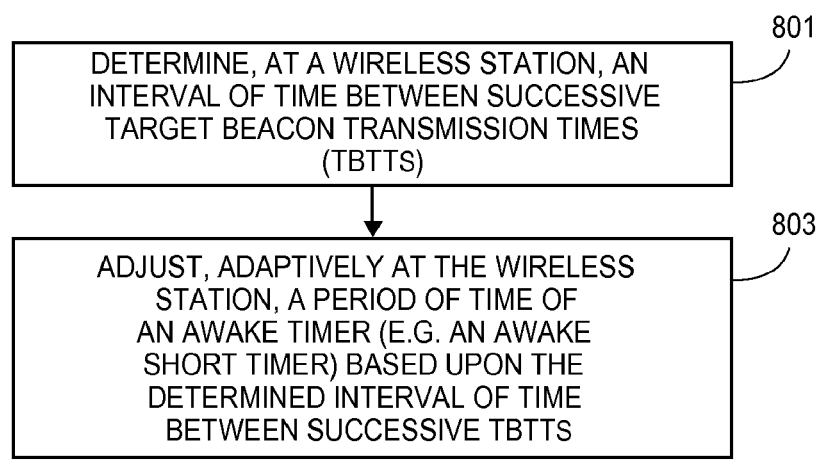
FIG. 8 is a flowchart showing an example of a wireless station according to the present invention which can adaptively adjust a period of time of an awake timer.

FIG. 8 shows another embodiment of the present invention in which a wireless station can adaptively adjust a period of time of one or more of its awake timers. In one embodiment, the wireless station can adaptively adjust the short awake timer rather than the long awake timer. For example, the wireless station can adaptively adjust the period of time used by the awake timer in the awake short timer state 414 or the awake short timer state 604 described above. In operation 801, the wireless station can determine an interval of time between successive target beacon transmission times. Different wireless access points can have different intervals of time between successive TBTTs. As the user of a wireless station moves around, the wireless access point which is in communication with the wireless station changes over time. With this embodiment, the wireless station can adapt the period of time used for an awake timer based upon the determined interval of time between successive TBTTs according to the current wireless access point which is in communication with the wireless station. This is shown in operation 803 in which the wireless station can adjust the period of time of the awake timer, which can be the timer used for the awake short timer state. In one embodiment, a wireless station can increase the period of the short timer when the interval of time between successive TBTT increases. For example, if one access point has a beacon interval of 100 milliseconds (the time interval between successive TBTTs is 100 milliseconds) then the wireless station can set the period of time for the awake short timer to be 20 milliseconds, whereas if another access point has a beacon interval of 300 milliseconds, the wireless station, when it is in communication with that access point, can set the short timer's period for the awake short timer state to 50 milliseconds. In one embodiment, the period of time for the short timer is scaled in proportion to the period of time of the interval of time between successive TBTTs.

Figure 9:
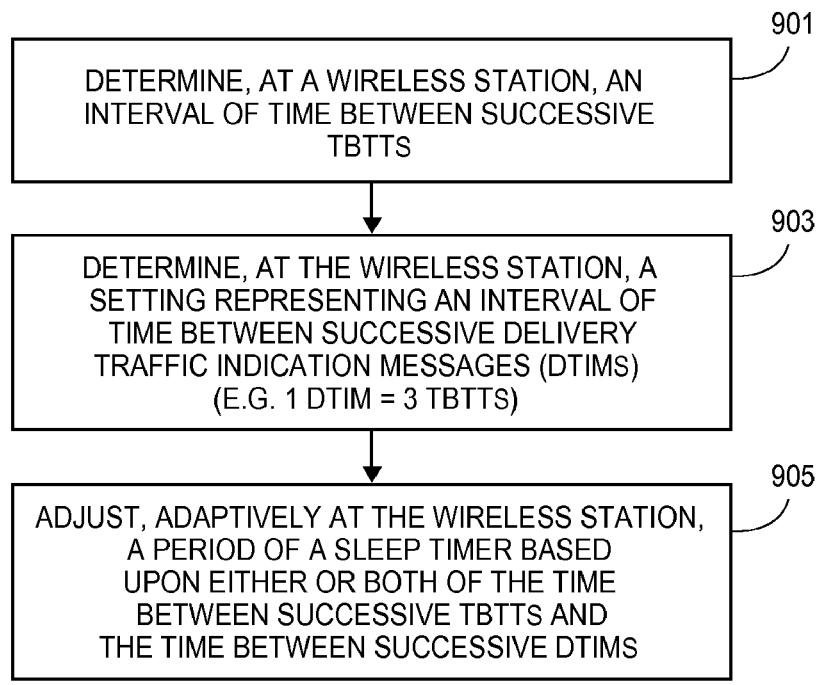
FIG. 9 is a flowchart showing an example of a method according to an embodiment of the present invention in which a period of a sleep timer is adaptively adjusted based upon certain parameters of the wireless access point with which the wireless station is communicating.

FIG. 9 shows an example of how, in one embodiment of the present invention, a wireless station can adaptively adjust a period of time for sleep based upon either or both of the time between successive TBTTs and the time between successive DTIMs. In operation 901, the system determines, at the wireless station, an interval of time between successive TBTTs. In operation 903, the system or wireless station determines a setting representing an interval of time between successive DTIMs. In one embodiment, for example, that period of time may be represented by three TBTTs. Then in operation 905, the system adaptively adjusts at the wireless station a period of time of a sleep timer based upon either or both of the time between successive TBTTs and the time between successive DTIMs.

Further details regarding the context and environment will now be provided while referring to FIGS. 2A, 2B, 3A, 3B, and 3C. FIG. 2A shows how two wireless stations 60 and 62 can communicate with two wireless access points 57 and 55; antenna 61 of wireless station 60 is shown communicating through antenna 58 of the AP 57 while wireless station 62 uses its antenna 63 to communicate with AP 55, through its antenna 56. The APs 55 and 57 may use different operating parameters (e.g. different times between successive TBTTs; different numbers of TBTTs between successive DTIMs, etc.) and each wireless station can adapt as described herein to change its radio power management techniques based on the AP with which it is currently communicating. If a station physically moves relative to the two APs and it stops communicating wirelessly with one AP (for example, because it is out of radio range) and begins communicating wirelessly with the other AP, then that station can adaptively change its radio power management techniques as described herein. The APs 55 and 57 are shown coupled (optionally) to a network interface 53 (e.g. a cable or DSL modem or other interface) to allow the wireless stations 60 and 62 to communicate to other devices on the network 51. It will be understood that the APs may permit the stations 60 and 62 to communicate with each other without the network interface 53. While the description has focused on the APs and the stations using radios operating under one of the IEEE 802.11 standards ("WiFi"), such as the 802.11G standard, it will be understood that the embodiments can be used with other wireless communication protocols (e.g. WiMax, cellular telephony, etc.).

FIG. 2B is a network view of the access point device 100A connected to a wired network 1003 to enable a group of computers 1006 of the wired network to communicate with another group of computers 1005 communicating through the access point device 100A, according to one embodiment. As shown in FIG. 2B, the access point device 100A is connected to the Internet 1002 through a wired network 1003, for example, a LAN that includes computers 1006. As shown in FIG. 2B, the wired network 1003 is connected to the Internet 1002 through the network interface 1004, for example, DSL and/or cable modem. Further, as shown in FIG. 2B, a wireless network of the computer 1005 and smartphone 1010 having wireless interfaces 1007 is formed by the access point device 100A through an antenna 112A. Further, as shown in FIG. 2B, the access point device 100A is connected through a USB connection to a printer 1009 such that the printer 1009 can be shared among computer 1005 and smartphone 1010.

FIG. 3A shows an example of a data processing system which may be a telephone device or a media player with an integrated wireless (e.g. WiFi) radio. The data processing system 320 includes a processing system, which may be one or more microprocessors, or which may be a system on a chip. The data processing system 320 also includes memory 324 which is coupled to the processing system 321; the memory may be used for storing data and programs for execution by the processing system. This memory may also store metadata and audio data for voicemails locally stored on the data processing system 320. The data processing system 320 also includes an audio input/output subsystem 323 which may include a microphone and a speaker for, for example, playing back music or providing telephone functionality through the speaker and microphone or for interacting with a voicemail server. A display controller and display device 326 provides a visual user interface for the user; this user interface may include a graphical user interface which is similar to that shown on a Macintosh computer when running the Mac OS X operating system software. System 320 also includes one or more wireless transceivers, such as a WiFi transceiver or an infrared transceiver or a Bluetooth transceiver, and/or a wireless cellular telephony transceiver. It will be appreciated that additional components, not shown, may also be part of the system 320 in certain embodiments, and in certain embodiments fewer components than that shown in FIG. 3A may also be used in a data processing system. The system 320 also includes one or more input devices 325 which are provided to allow a user to provide input to the system. These input devices may be a keypad or a keyboard or a touch panel or a multi-touch input panel (configured to concurrently receive and process multiple touches) or other known input devices or a combination of such input devices. The system 320 may also include an optional input/output (I/O) device 327 which may be a connector for a dock or a connector for a USB interface, etc. It will be appreciated that one or more buses, not shown, may be used to interconnect the various components shown in FIG. 3A, as is well-known in the art. The data processing system shown in FIG. 3A may be a handheld personal computer or a personal digital assistant (PDA), or a cellular telephone with PDA-like functionality, or a WiFi based telephone, or a handheld computer which includes a cellular telephone, or a media player, such as an iPod, or an entertainment system, such as a PlayStation entertainment system, or devices which combine aspects or functions of these devices, such as a media player combined with a PDA and a cellular telephone in one device, or a consumer electronic product or other electronic products. In other embodiments, the data processing system 320 may be a network computer or an embedded processing device within another device or consumer electronic product. In certain embodiments, if the data processing system 320 is a telephone device which is a land line telephone, the wireless transceivers 322 may be omitted.

FIG. 3C is a block diagram of an embodiment of a wireless access point, which can be one of the access points 57 or 55 shown in FIG. 2A. The access point can include a microprocessor 305 and a firmware 306 connected to a bus 309. The microprocessor 305 may be an integrated circuit, which includes a processor, a random access memory ("RAM"), a read only memory ("ROM"), and input/output ("I/O") ports. The microprocessor 305, when it powers up, executes the firmware 306 to perform methods and functions of a wireless access point. For an embodiment, the firmware 306 may be stored in non-volatile storage 307 and/or in other places, for example, in a separate memory. As shown in FIG. 3C, the microprocessor 305 and the firmware 306 may be connected through a bus 507 to a random access memory ("RAM") 308, a non-volatile storage 307, and an I/O controller 310. The non-volatile storage 307 may be a storage that retains its content when power is turned off. The non-volatile storage 307 or RAM 308 may used to store data which is pending at the AP for a station.

For an embodiment, the I/O controller 310 controls a wireless transmitter and receiver ("transceiver") 311, a USB port 313, a wired network port 314 (e.g., an Ethernet port). The wireless transceiver 311 can be connected to the antenna 312 to transmit and receive ("transfer") the information wirelessly. For an embodiment, the wired network port 314 may include an Ethernet (LAN) port, Ethernet (WAN) port, and/or both. For an embodiment, the USB port 313 may connect a printer and/or other USB peripherals.

As shown in FIG. 3B, the computer system 71, which is a form of a data processing system, includes a bus 72 which is coupled to a microprocessor(s) 73 and a ROM (Read Only Memory) 77 and volatile RAM 75 and a non-volatile memory 76. The microprocessor 73 may be one or more microprocessors from Intel. The bus 72 interconnects these various components together and also interconnects these components 73, 77, 75, and 76 to a display controller and display device 74 and to peripheral devices such as input/output (I/O) devices which may be a touch input panel, mice, keyboards, modems, network interfaces, printers and other devices which are well known in the art. Typically, the input/output devices 79 are coupled to the system through input/output controllers 78. The volatile RAM (Random Access Memory) 75 is typically implemented as dynamic RAM (DRAM) which requires power continually in order to refresh or maintain the data in the memory. The mass storage 76 is typically a magnetic hard drive or a magnetic optical drive or an optical drive or a DVD RAM or other types of memory systems which maintain data (e.g. large amounts of data) even after power is removed from the system. Typically, the mass storage 76 will also be a random access memory although this is not required. While FIG. 3B shows that the mass storage 76 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 72 may include one or more buses connected to each other through various bridges, controllers and/or adapters as is well known in the art. In one embodiment the I/O controller 78 includes a USB (Universal Serial Bus) adapter for controlling USB peripherals and an IEEE 1394 controller for IEEE 1394 compliant peripherals. The system 71 also includes a wireless RF radio transceiver which can implement one or more of the embodiments described herein.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 77, RAM 75, mass storage 76 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 73.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for communicating with a wireless access point, the method comprising:
    determining, at wireless mobile station, an interval of time between successive target beacon transmission times (TBTTs);
    adjusting a period of time of an awake timer based at least in part on the interval of time; and
    starting the awake timer in response to receiving data while the mobile wireless station is in a low-power state.

2. The method of claim 1, wherein the adjusting comprises scaling a default value of the period of time based at least in part on the interval of time between successive TBTTs to produce an adjusted period of time of the awake timer.

3. The method of claim 1, further comprising:
    transitioning the wireless mobile station to a higher power state in response to the awake timer counting.

4. The method of claim 1, wherein the adjusting occurs adaptively in response to a change of the wireless access point, the change of the wireless access point comprising a change from a first wireless access point no longer in communication with the wireless mobile station to a second wireless access point in communication with the wireless mobile station.

5. The method of claim 1, wherein the awake timer comprises a first awake timer and a second awake timer, the method further comprising:
    starting the first awake timer in response to receiving data; and
    starting the second awake timer in response to receiving a data pending message associated with a TBTT, wherein the first awake timer comprises a first period of time and the second awake timer comprises a second period of time longer than the first period of time.

6. The method of claim 5 further comprising:
    starting a sleep timer in response to an expiration of the first awake timer or the second awake timer, wherein the wireless mobile station exits the low-power state at an expiration of the sleep timer.

7. The method of claim 6, wherein the sleep timer comprises a time period based at least in part on network activity.

8. The method of claim 5, further comprising:
    starting the second awake timer in response to determining that data is pending at the wireless access point following the expiration of the sleep timer.

9. The method of claim 1, further comprising:
    starting the awake timer in response to the wireless mobile station sending data to the wireless access point.

10. A system comprising:
a memory; and
at least one processor coupled to the memory and configured to:
    determine an interval of time between successive target beacon transmission times (TBTTs) received at a wireless mobile station from a wireless access point;
    adjust a period of time of an awake timer based at least in part on the determined interval of time between successive TBTTs; and
    start the awake timer in response to receiving data from the wireless access point.

11. The system of claim 10, wherein to adjust the period of time of the awake timer, the at least one processor is further configured to scale a default value of the period of time based at least in part on the interval of time between successive TBTTs to produce an adjusted period of time of the awake timer.

12. The system of claim 10, wherein a radio of the wireless mobile station is in a higher power state in response to the awake timer counting.

13. The system of claim 12, wherein to adjust the period of time of the awake timer, the at least one processor is further configured to adjust the period of time adaptively in response to a change of the wireless access point, wherein the change of the wireless access point comprises a change from a first wireless access point no longer in communication with the wireless mobile station to a second wireless access point in communication with the wireless mobile station.

14. The system of claim 10, wherein the awake timer comprises a first awake timer and a second awake timer, and the at least one processor is further configured to:
    start the first awake timer in response to receiving data from the wireless access point; and
    start the second awake timer in response to receiving a data pending message associated with a TBTT, wherein the first awake timer comprises a first period of time and the second awake timer comprises a second period of time longer than the first period of time.

15. The system of claim 14, wherein the at least one processor is further configured to:
   start a sleep timer in response to an expiration of the first awake timer or the second awake timer; and
   cause the wireless mobile station to exit a low-power state of a radio frequency (RF) radio at an expiration of the sleep timer.

16. The system of claim 15, wherein the sleep timer comprises a time period based at least in part on network activity.

17. The system of claim 15, wherein the at least one processor is further configured to restart the counting of the sleep timer in response to determining that no data is pending for the wireless mobile station at the wireless access point following an expiration of the sleep timer.

18. The system of claim 14, wherein the processor is further configured to restart counting of the first awake timer in response to the wireless mobile station receiving data from the wireless access point or the wireless mobile station sending data to the wireless access point.

19. A non-transitory machine readable storage medium having instructions stored thereon that, in response to being executed by at least one computing device, causes the at least one computing device to perform operations comprising:
   determining, at the at least one computing device, an interval of time changed between successive target beacon transmission times (TBTTs) received from a wireless access point;
   adjusting, based at least in part on the interval of time between successive TBTTs, a period of time of a first awake timer in response to the determining the interval of time between successive TBTTs changed;
   starting the first awake timer in response to (i) the at least one computing device receiving data from the wireless access point while the at least one computing device is in a low-power state or (ii) the at least one computing device sending data to the wireless access point while the at least one computing device is in a higher power state;
   starting a second awake timer in response to the at least one computing device receiving a data pending message from the wireless access point, wherein the at least one computing device is in the higher power state while the second awake timer is counting; and
   starting a sleep timer in response to an expiration of the first awake timer or an expiration of the second awake timer, wherein the at least one computing device is in a low-power state prior to the sleep timer expiring.

20. The non-transitory machine readable storage medium of claim 19, wherein the at least one computing device is in a higher power state in response to the at least one computing device sending data to the wireless access point or the at least one computing device receiving data from the wireless access point.

* * * * *